United States Patent Office 3,096,688
Patented July 9, 1963

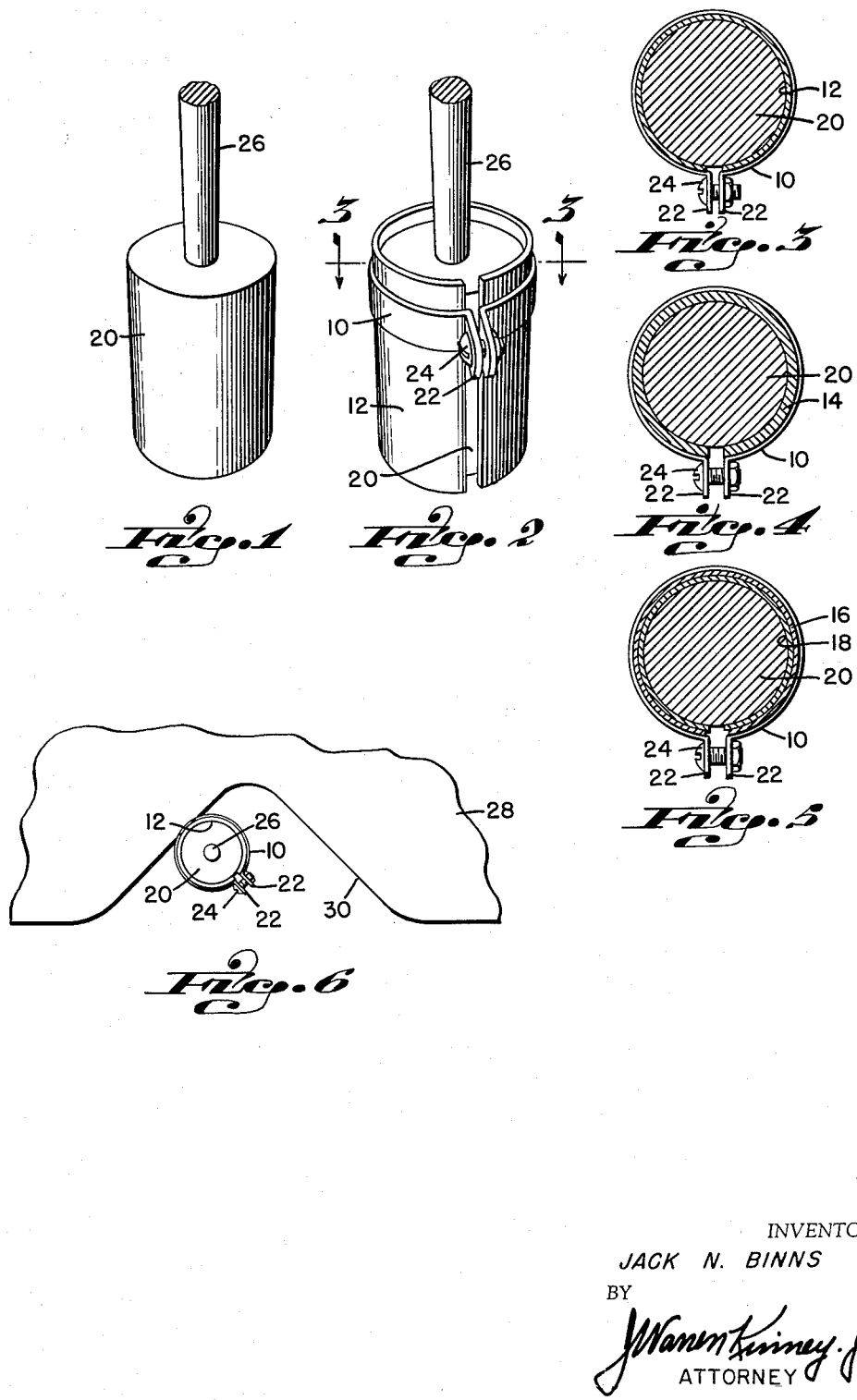

3,096,688
TRACER FINGER FOR AUTOMATIC TRACER AND METHOD AND MEANS OF COORDINATING SAME WITH A CUTTER
Jack N. Binns, 4886 Oaklawn Drive, Cincinnati, Ohio
Filed June 19, 1957, Ser. No. 666,544
6 Claims. (Cl. 90—62)

This invention relates to an improved tracer finger for duplicating or profiling machines, and to a method and means of varying the diameter of the tracer finger to coordinate it with a tool or cutter under the control thereof. The present invention is particularly directed to a tracer finger of the type which does not rotate with respect to its point or area of contact with a template which the tracer finger follows for imparting movements to the finger which are translated to a cutter through the sensitive mechanism of a tracer box mounted on the duplicating machine.

It has been customary heretofore to keep on hand many different sizes of tracer fingers and grind them, if necessary, to obtain correspondency with the multiplicity of cutter sizes used in duplicating or profiling operations, with the result that the investment in tracer fingers, and in the work of cataloging them, often became items of expense prohibitory in amount.

One object of the present invention is to so improve the tracer finger construction as to avoid the need for producing and stocking an unreasonable number of tracer fingers, without in any degree limiting the performance or capacity of the duplicating machine to efficiently and rapidly meet production requirements.

Another object of the invention is to expedite and facilitate setting up a duplicating or profiling machine for production, with resultant savings of time and labor, utilizing the method and means herein disclosed.

A further object is to minimize the cost and the amount of equipment needed in setting up and operating automatic duplicating machinery, thereby to reduce production expense and inventory costs.

Another object is to provide a method and means of achieving a high degree of accuracy in coordinating the tracing fingers and the cutters of duplicating or profiling machines, thereby to enhance the quality of the work produced by such machines.

The foregoing and other objects are attained by the means described herein and illustrated upon the accompanying drawings, in which:

FIG. 1 is a perspective view of a typical or basic tracer finger to which the present invention is applicable.

FIG. 2 is a perspective view of the tracer finger modified to alter the effective diameter thereof.

FIG. 3 is a cross-sectional view taken on line 3—3 of FIG. 2, illustrating a shim clamped about the finger body.

FIG. 4 is a view similar to FIG. 3, showing the finger carrying a shim of greater thickness.

FIG. 5 is a similar view indicating how the finger diameter may be accurately established with the use of a plurality of shims differing in thickness.

FIG. 6 is a top view of a shimmed tracing finger, and showing its operating relationship to a template of a typical duplicating or profiling machine.

Persons skilled in the art to which the present invention appertains will understand that a typical duplicating or profiling machine comprises generally some form of means to support a work blank, a template or pattern determinative of certain operations to be performed upon the work blank, a tracer finger to follow the contour of the template or pattern, and highly sensitive means usually housed in a tracer box, for translating various movements of the tracer finger to a cutter operative upon the work blank as the finger traces the template or pattern. The general arrangement of the mechanism is disclosed in numerous issued patents, such as that of E. G. Roehm, No. 2,332,533, issued October 26, 1943.

In setting up such a machine for production, it is necessary to make certain critical adjustments, one of which is concerned with the effective diameter of the tracer finger as related to the size of a selected cutter which is to shape the workpiece. To properly shape the workpiece, it is necessary that the diameter of the tracer finger be coordinated with the cutter size, or that the cutter size be coordinated with a tracer finger, which latter is usually selected from an extensive rack or store of tracer fingers carefully preserved and protected against injury or loss. The tracer fingers are quite costly and must never be subjected to abuse in handling, yet substantial losses are suffered from time to time due to wear of, accidental injury to, or loss of, the tracer fingers. One of the objectives of the present invention is to minimize such losses by making possible the use of only a few tracer fingers, in place of many, as heretofore thought necessary, so that problems of storage, handling, cataloging and the like are practically eliminated, with a corresponding reduction of risk incident to tracer finger loss from wear and damage.

According to the method and means of the present invention, a complete set of tracer fingers for each size of cutter may comprise three or possibly four basic fingers differing quite noticeably in diameter, and accompanied by a variety of inexpensive shims to be wrapped about any one of the fingers and held in place thereon by means of a suitable clamp, such as 10. In the drawing, the shims are illustrated as sheets or longitudinally slitted tubes, numbered 12, 14, 16 and 18, and differing from one another in thickness, as is quite apparent at 12 and 14. By applying shims of different gauge thicknesses to the body portion 20 of any basic tracer finger, the effective diameter of the tracer finger may be varied by increments measured in thousandths of an inch. Very close tolerances may be met by the use of plural shims 16 and 18, properly selected for gauge and combined for application to the tracer finger body.

The number of shims constituting a full set may vary, depending upon the increments at which the tracer finger diameter is to be increased in size. There should be enough shims in a set, however, to build up a tracer finger diameter to approximately the diametral dimension of the next larger basic finger, thereby to avoid leaving an objectionable gap in the succession of tracer finger diameters obtainable with use of the shims. The shims, as supplied, may be either in flat form, or in preformed split-tube condition as illustrated upon the drawing, this being purely a matter of choice.

The clamp 10, which may be of any acceptable type, is disclosed by way of example as a mere split ring, the ends 22 of which are turned outwardly at an angle and pierced to receive a screw 24 whereby the clamp may be contracted tightly about the shim and the upper portion of the tracer finger body. The character 26 indicates the stem of the tracer finger, which in practice has operative connection with a movable part of the mechanism within the tracer box.

It will be understood that the lower portion of the shim, or the skirt thereof extending downwardly from the clamp 10, is adapted to bear against and follow the contour of template 28 as shown in FIG. 6, the track or controlling edge of the template being indicated at 30. From the disclosure of FIG. 6, it is readily appreciated that the lateral distance from the axis of stem 26 to any given point may be varied with micrometric precision, by applying to the tracer finger shims of various thicknesses. This constitutes one of the important adjustments whereby the forming cutter is controlled by the tracer finger and template, to duplicate the workpiece with precision. Very close tolerance may be observed by the instant method of modifying the tracer finger with the use of shims as disclosed.

By way of example, if it be assumed that a rough cut, semi-finish cut and a finish cut are to be made from a single template, the following procedure would be followed: First a tracer finger 20 having a diameter equal to the diameter of the cutter is selected. Then, if the roughing cut is to exceed the finish cut by .030, a shim .030 thick is securely clamped in place, as in FIG. 2, and the tool will duplicate the template in the workpiece which will be .030 larger. Then for the semi-finish cut the .030 shim is removed and a thinner shim, say .010, is mounted to the finger whereby the tool will remove .020 from the workpiece which will then be .010 larger than desired. The final or finish cut is then made with no shims on the finger for producing an exact duplicate of the template in the workpiece.

The application and removal of shims is accomplished with ease and dispatch, affording more rapid adjustments than were obtained by the old method of bodily replacing or re-grinding tracer fingers in correspondency with different cutter sizes. The number of tracer fingers needed for keeping a profiling or duplicating machine in operation, is by reason of the present invention reduced to a practical minimum, with substantial savings of expense as was previously explained. The apparatus and method may be subject to change or modification, within the scope of the appended claims, without departing from the spirit of the invention.

What is claimed is:

1. The method of adjusting a tracer finger with respect to a template to modify the shape reproduced by a given forming cutter of an automatic duplicating machine, which method comprises employing a tracer finger dimensioned non-conformably with a critical dimension of the cutter, and modifying the resultant relationship between the cutter and workpiece, by interposing shim means between the tracer finger and the template.

2. The method of adjusting the effective radius of a substantially cylindrical tracer finger with respect to a template, of a duplicating machine for altering the shape reproduced by a given cutter and template without changing the shape of the template or the size of the cutter, which method comprises employing a tracer finger dimensioned non-conformably with a critical dimension of the cutter, and modifying the resultant relationship between the cutter, template and workpiece, by securing a compensating shim on the tracer finger in position to bear against the template and space said finger therefrom, whereby the reproduced shape will differ from the shape of the template by the thickness of said shim.

3. In an automatic duplicating machine, the combination of a template having a track, a tracer finger adapted to contact the track and follow the contour thereof, said tracer finger having a central axis, and shim means secured to and carried by the tracer finger and interposed between said finger and the track of the template, for altering the spacing of the axis of the finger from the track upon a line normal to the track and passing through the axis of the tracer finger.

4. The method of adjusting the effective radius of a substantially cylindrical tracer finger of a duplicating machine, such that with respect to a given template and cutter the reproduced shape can be modified without changing the size or shape of said template and cutter, which method comprises employing a tracer finger having an effective radius dimensioned approximately in conformity with a given cutting characteristic of the cutter, and of then modifying the relationship between the cutter, shape reproduced, tracer finger and template by fixedly securing shimming means directly to the template-engaging portion of said finger, wherein the reproduced shape differs from the shape of the template by the thickness of said shimming means.

5. In combination, a tracer finger having a substantially cylindrical outer surface, a shim having a substantially constant thickness and defining a split tubular member, said shim substantially surrounding said tracer finger and having an inner surface thereof in contacting relationship with a major circumferentially extending portion of the cylindrical outer surface of said tracer finger, and clamping means encircling and engaging the outer surface of said shim, said clamping means urging said shim into tight engagement with the outer surface of said tracer finger.

6. In combination, a tracer finger comprising a body portion carrying a stem affixed thereto, the body portion being substantially cylindrical, elongate in form and having opposite end portions and being substantially larger than the stem, shim means fixedly secured to, carried by and substantially surrounding said body portion to increase the effective radius of the tracer finger, and securing means substantially surrounding the shim means and body portion for securing the shim directly to the body portion near one end portion of the body portion.

References Cited in the file of this patent

UNITED STATES PATENTS

| | | |
|---|---|---|
| 1,440,679 | Hatcher et al. | Jan. 2, 1923 |
| 1,729,883 | Lessman | Oct. 1, 1929 |
| 2,235,092 | Wall | Mar. 18, 1941 |
| 2,480,399 | Dolaser | Aug. 30, 1949 |
| 2,557,876 | Klema | June 19, 1951 |
| 2,607,989 | Peterson et al. | Aug. 26, 1952 |
| 2,828,674 | Wetzel | Apr. 1, 1958 |